Patented Aug. 2, 1949

2,477,558

UNITED STATES PATENT OFFICE 2,477,558

PREPARATION OF HIGH-GRADE CRUDE LACTOSE

Emory F. Almy and Orlando F. Garrett, Columbus, Ohio, assignors to M & R Dietetic Laboratories, Inc., a corporation of Ohio No Drawing. Application April 26, 1945, Serial No. 590,506

8 Claims. (Cl. 127—31)

This invention relates to a new method of preparing a stable, high quality, crude lactose from milk products, and more particularly to the preparation of such products from sweet cheese wheys.

The products produced in accordance with the method of the present invention are fine, creamy white powders which are stable at room temperatures for several months. They have a very high degree of solubility in water, giving slightly straw-colored, translucent solutions, and are suitable for use in food products without further purification. They may also be used as a source of pure lactose when redissolved and recrystallized under suitable conditions.

The method of the present invention comprises, in general, a preliminary treatment of the sweet whey to remove the heat-coagulable portion of the nitrogenous constituents of the whey, the treatment of the substantially protein-free whey with suitable ion-exchange materials to remove the mineral salts and the subsequent drying of the resulting whey serum to form the aforesaid product. The removal of the heat-coagulable portion of the nitrogenous constituents of the whey, which is essentially a deproteinizing treatment, is preferably effected in accordance with our invention by procedures involving an initial acidification of the whey by contact thereof with a cation-exchange material acting in its hydrogen cycle, since by virtue of this initial treatment larger amounts of the nitrogenous constituents of the whey are removed than are possible with any of the prior art methods.

In the ordinary methods of preparing lactose whey is usually clarified by removing the protein either by the addition of lime or by acidification, followed by heating to coagulate the protein. The clear whey is either decanted, siphoned off or filtered, concentrated to a thin syrup and then again filtered. It is then further concentrated to the point at which crystallization begins, run into crystallizing pans where it is cooled and allowed to stand with stirring until crystallization is complete. The lactose crystals are removed by centrifuging and washed with cold water. The filtrate and washing may be reworked to recover some of the lactose carried in solution, but is not usually so treated due to the high concentration of salts and other impurities therein. By this process, due to the various operations involved, only about 2.5–3.5% of lactose, based on the original weight of whey, can be recovered, since the mother liquor and washings contain about 10–15 parts by weight of lactose per 100 parts of water. In contrast, in accordance with our method substantially all of the lactose (about 4–5% based on the original whey) may be recovered, since any residual non-lactose material present in the lactose is soluble and of nutritional value and need not be removed.

In the practice of our process we prefer to use as the raw material a sweet cheese whey having a titratable acidity of about 0.1 to 0.2% (a pH of, preferably, about 5.8 to about 6.65 in the whey as it drained from the curd); however, other wheys and even skim milk can be used, although the results are not as satisfactory. It is of advantage to use sweet whey or whey with very little naturally developed acidity, since developed acidity increases at the expense of the lactose content of the whey and the resulting higher acid wheys have a lower initial lactose concentration. Acidification of the whey by the use of acids is likewise less desirable, since it introduces salts which must later be removed. Such sweet wheys as are obtained from the manufacture of cheddar, Swiss or other similar cheese-making processes or from the manufacture of rennet-type casein are especially suitable for use in accordance with the present invention. The wheys usually have the following approximate composition: 1% whey proteins, 0.6% ash or minerals, 5% lactose and 93.4% water.

In practicing our process in connection with the treatment of sweet whey, for example, the whey is first treated (deproteinized) to remove the coagulable portion of the nitrogenous constituents of the milk which are present in the whey. This is done by first acidifying the whey to a pH of about 4.6–4.8. The acidification may be effected by the addition of an edible acid such as lactic, tartaric, acetic or hydrochloric acids, but we prefer to accomplish this by the use of a suitable cation-exchange material acting in its hydrogen cycle. Common materials of this type are those known to the trade as ZeoKarb, Amberlite IR–1, Amberlite IR–100, etc. About one-third of the whey to be treated is allowed to pass downflow or upflow through a suitable bed of such exchanger at a definite rate. For example, we have found that 1 cu. ft. of ZeoKarb-H will convert 60–70 gallons of sweet cheddar cheese whey to such acidity that when mixed with 125–150 gallons of untreated sweet whey, the resulting mixture will have the desired pH of about 4.6–4.8. The blending of the exchange material-treated whey with the untreated whey is controlled by testing the pH at intervals during the addition of the exchanger-treated portion of the whey, and continuing the addition until the desired pH is attained.

By acidification in the above manner the resulting whey is rendered sufficiently acid so that coagulable nitrogenous constituents can be removed by heating. The use of the hydrogen-cycle exchanger method to secure the desired acidity in the whey is of particular value because in addition to accomplishing this, it at the same time effects a substantial substitution of hydrogen-ions for metal ions, thereby removing a portion of the salts at this early stage of the process. The acidified whey is now heated to about 175–210° F. and held for about 15 minutes to throw out the coagulable portion of the nitrogenous constituents (casein, albumin and globulin). The whey is cooled to about 100–125° F. and may then be siphoned off or otherwise removed from the coagulum, or suitable additions of inert filter aids may be added and the coagulated material removed by a suitable method of filtering. The whey at this point is a perfectly clear, greenish-yellow solution having about the following composition: 0.38–0.41% non-coagulable nitrogenous constituents (calculated as protein), or 40–45% of the original concentration; 3.85–4.6 lactose (lowered from the original 5% due to dilution in the rinsing out tanks, filter presses, etc.); 0.030–0.036% Ca as compared to 0.044 to 0.055% originally present, or 20–50%, averaging approximately one-third, of the original Ca-content, together with similar reductions in the other metal-ions such as sodium, potassium, and magnesium which are responsible for the ash of the whey. As pointed out above, one of the outstanding advantages of the preferred method of deproteinizing the whey is that it removes a larger portion of the nitrogenous constituents than is possible with other methods.

Following the filtration, they whey is next treated to remove the remaining mineral salts by a combination of suitable ion-exchange materials. Thus, it is first passed through a suitable sized bed of cation-exchange material operating in the hydrogen-cycle. For example ZeoKarb, Amberlite IR-100, etc., may be used in the proportion of about 5 cu. ft. of exchanger bed to about 200–250 gallons of deproteinized whey, the whey being passed through at the rate recommended for best operation for the type of exchanger material used. This operation removes the major portion of the remaining metal-ions, the completeness of removal depending upon the ratio of whey used to exchanger. In the above illustrative example about 90–95% of the metal ions will be removed. Removal of the metal ions by the cation-exchanger is accomplished by substituting hydrogen-ions in the whey, leaving free acids, and the treated whey now has a pH of about 1.6–1.8.

This cation-exchanger-treated whey is passed next through a suitable bed of acid- or anion-removing exchanger, for example DeAcidite, Amberlite IR-4, An-ex, etc. It was found that about 2.5–3.5 cu. ft. of DeAcidite was sufficient for the removal of anions from the 200–250 gallons of deproteinized whey of the above illustrative example, when the whey was passed through at the rate of about 2 gallons per sq. ft. of cross section of bed per minute. The effluent from the anion-exchanger bed is a clear, water-white solution with a sweetish taste, having a pH varying usually from about 7.5 to 9.0 and has about the following composition: lactose 3–4%, calcium 0.0003–0.001%, phosphorus 0.004–0.005%, non-coagulable nitrogenous constituents (calculated as protein) 0.09–0.16%. In addition, it contains small traces of other mineral constituents such as sodium, potassium and chlorine, not in excess of about 0.005% total, and the remainder of the solution is water. Essentially, the effluent is about a 3–4% solution of lactose with less than about 0.1% total minerals and less than about 0.2% of non-coagulable nitrogenous substances. The lactose appears lower than in the untreated whey because the whey is unavoidably diluted slightly in displacing water from the exchanger beds. It should be noted that this is not an actual loss in lactose, but represents simply a greater volume of solution containing all the lactose originally present in the whey.

The final effluent is slightly alkaline, and for production of the whitest shade of lactose it should be rendered slightly acid (pH 6.5–6.8) by the addition of the required amount of edible acid such as hydrochloric, tartaric, acetic or lactic acids. The slightly acid whey is then concentrated in a suitable vacuum pan to about 30–40% total solids, and finally dried either by a spray or drum drying apparatus, for example. The spray-drying procedure is preferred, since it results in a fine porous powder which requires no grinding and caramelization is avoided, but a drum dryer can be utilized with satisfactory results.

The typical final product when spray-dried is a fine, creamy-white powder which is practically odorless, tasteless except for the sweet taste of the lactose, and stable at room temperatures for many months. It has the following analysis, taken from a typical run, as an example:

| | Per cent |
|---|---|
| Lactose | 95.2 |
| Non-coagulable nitrogenous constituents (as protein) | 2.6 |
| Moisture | 1.4 |
| Ash | 0.8 |

The non-coagulable nitrogenous constituents have been found to consist of about one-half in the form of proteose-peptone nitrogen, a trace of globulin-nitrogen and the remainder in the form of the non-protein nitrogenous constituents characteristic of milk and whey. All of these constituents are utilizable forms of nitrogen and of dietary value and do not detract from the solubility of the product. The ash constituents present are likewise of nutritive value, consisting of small amounts of calcium, phosphorus and the other natural mineral elements characteristic of milk, but which have been sufficiently reduced in concentration so as to render them soluble in all concentrations at which the lactose itself will dissolve.

By the above described procedure we are able to produce a high quality crude lactose in which those small percentages of milk constituents still remaining have been so altered in concentration as to be soluble in any proportion which the lactose itself is soluble. This procedure accomplishes the reduction in proteins and salts in such a way that no appreciable loss of lactose is experienced, thus recovering practically all the lactose present in the original whey rather than the 50-75% recovery possible with ordinary crystallization methods. The resulting product has a high degree of purity (above about 95% lactose), and its non-lactose constituents consist of nutritionally valuable soluble nitrogenous and mineral constituents retained from the original whey. The product further exhibits good keeping quality, samples having been stored in friction top cans and screw-top bottles for more than four months at room temperature with no noticeable deterioration in odor, flavor, consistency or solubility.

While in the detailed description of the invention we have referred to sweet whey as the starting material, the invention is not to be construed as limited to the use of this preferred material, for other starting materials such as whey produced by acid precipitation of casein from skim milk as well as skim milk itself may be used in accordance with the invention. The use of skim milk is not altogether satisfactory because excessive protein coagulation takes place in the exchanger bed due to the relatively high protein content of this material. It is to be understood that the invention is not to be construed as limited to the details of the illustrative embodiment of the invention since these details may be varied to meet varying conditions, including the nature of the starting material.

We claim:

1. The method of producing a high quality crude lactose comprising contacting a lactose-containing material of a class consisting of whey and skim milk with a cationic exchanger material acting in the hydrogen cycle to reduce the pH of the material to about 4.6 to 4.8, heating the acidified material to about 175° F. to 210° F. to coagulate the proteins contained therein, separating the coagulated proteins from the treated material, contacting the residual material with a cationic exchanger material acting in the hydrogen cycle and with an anionic exchanger material to remove salts therefrom to the extent of about 90 to 95%, and drying the resulting material.

2. The method of producing a high quality crude lactose comprising contacting a lactose-containing material of a class consisting of whey and skim milk with a cationic exchanger material acting in the hydrogen cycle to reduce the pH of the material to about 4.6 to 4.8, heating the acidified material to about 175° F. to 210° F. to coagulate the proteins contained therein, separating the coagulated proteins from the treated material, contacting the residual material with a cationic exchanger material acting in the hydrogen cycle and with an anionic exchanger material to remove salts therefrom to the extent of about 90 to 95% and thereby also give a resulting material having a pH of about 7.5 to 9.0 acidifying the said material to a pH of about 6.5 to 6.8, and drying the same.

3. The method of producing a high quality crude lactose comprising contacting whey with a cationic exchanger material acting in the hydrogen cycle to reduce the pH of the whey to about 4.6 to 4.8, heating the acidified whey to about 175° F. to 210° F. to coagulate the proteins contained therein, separating the coagulated proteins from the treated whey, contacting the residual material with a cationic exchanger material acting in the hydrogen cycle and with an anionic exchanger material to remove salts therefrom to the extent of about 90 to 95%, and drying the resulting material.

4. The method of producing a high quality crude lactose comprising contacting whey with a cationic exchanger material acting in the hydrogen cycle to reduce the pH of the whey to about 4.6 to 4.8, heating the acidified whey to about 175° F. to 210° F. to coagulate the proteins contained therein, separating the coagulated proteins from the treated whey, contacting the residual material with a cationic exchanger material acting in the hydrogen cycle and with an anionic exchanger material to remove salts therefrom to the extent of about 90 to 95%, and spray-drying the resulting material.

5. The method of producing a high quality crude lactose comprising contacting whey with a cationic exchanger material acting in the hydrogen cycle to lower the pH of the whey to about 4.6 to 4.8, heating the acidified whey to about 175° F. to 210° F. to coagulate the proteins contained therein, separating the coagulated proteins from the treated whey, contacting the residual material with a cationic exchanger material acting in the hydrogen cycle and with an anionic exchanger material to remove salts therefrom to the extent of about 90 to 95% and thereby also give a resulting material having a pH of about 7.5 to 9.0, acidifying the said material to a pH of about 6.5 to 6.8, and drying the same.

6. The method of producing a high quality crude lactose comprising contacting whey with a cationic exchanger material acting in the hydrogen cycle to lower the pH of the whey to about 4.6 to 4.8, heating the acidified whey to about 175° F. to 210° F. to coagulate the proteins contained therein, separating the coagulated proteins from the treated whey, contacting the residual material with a cationic exchanger material acting in the hydrogen cycle and with an anionic exchanger material to remove salts therefrom to the extent of about 90 to 95% and thereby also give a resulting material having a pH of about 7.5 to 9.0, acidifying the said material to a pH of about 6.5 to 6.8, and spray-drying the same.

7. The method of producing a high quality crude lactose comprising contacting a lactose-containing material of a class consisting of whey and skim milk with a cationic exchanger material acting in the hydrogen cycle to reduce the pH of the material to about 4.6 to 4.8, heating the acidified material to about 175° F. to 210° F. to coagulate the proteins contained therein, separating the coagulated proteins from the treated material, contacting the residual material with a cationic exchanger material acting in the hydrogen cycle and with an anionic exchanger material to remove salts therefrom, and drying the resulting material.

8. The method of producing a high quality crude lactose comprising contacting a lactose-containing material of a class consisting of whey and skim milk with a cationic exchanger material acting in the hydrogen cycle to reduce the pH of the material to about 4.6 to 4.8, heating the acidified material to about 175° F. to 210° F. to coagulate the proteins contained therein, separating the coagulated proteins from the treated material, contacting the residual material with a cationic exchanger material acting in the hydrogen cycle and with an anionic exchanger material to remove salts therefrom and thereby also give a resulting material having a pH of about 7.5 to 9.0, acidifying the said material to a pH of about 6.5 to 6.8, and drying the same.

EMORY F. ALMY.
ORLANDO F. GARRETT.

REFERENCES CITED

The following references are of record in the file of this patent:

UNITED STATES PATENTS

| Number | Name | Date |
|---|---|---|
| 758,065 | Hall | Apr. 26, 1904 |
| 2,104,501 | Adams et al. | Jan. 4, 1938 |
| 2,145,109 | De Lisle | Jan. 24, 1939 |
| 2,151,883 | Adams et al. | Mar. 28, 1939 |
| 2,155,318 | Liebknecht | Apr. 18, 1939 |
| 2,319,649 | Walsh | May 18, 1943 |
| 2,365,221 | Shafer | Dec. 19, 1944 |

FOREIGN PATENTS

| Number | Country | Date |
|---|---|---|
| 116,691 | Australia | Mar. 9, 1943 |
| 542,846 | Great Britain | Jan. 29, 1942 |

OTHER REFERENCES

Chem. Soc. Journal, New Series, vol. 48, 1885, page 848. Copy in Division 43.

Englis et al.: "Production of a palatable artichoke sirup," Ind. and Engr. Chem., vol. 34, No. 7, July 1942, pages 864–867.

Meyers et al.: "Synthetic resins as exchange adsorbents," Ind. and Engr. Chem., vol. 33, No. 6, June 1941, pages 697–706 (pages 705 and 706 pertinent). (Copy in Division 43.)